United States Patent [19]

Alseth

[11] Patent Number: 5,437,108
[45] Date of Patent: Aug. 1, 1995

[54] FOOD DEHYDRATOR AND TRAY FOR A DEHYDRATOR

[75] Inventor: Steven Alseth, Cologne, Minn.

[73] Assignee: American Harvest, Inc., Chaska, Minn.

[21] Appl. No.: 956,395

[22] Filed: Oct. 5, 1992

[51] Int. Cl.[6] .................................................. F26B 25/18
[52] U.S. Cl. ............................................ 34/196; 34/197; 34/238; 34/211; 99/483
[58] Field of Search .................. 34/195, 196, 197, 200, 34/192, 237, 238; 219/400; 99/483, 467; 206/557, 558, 561, 564; 211/126, 188

[56] References Cited

U.S. PATENT DOCUMENTS

| | | | |
|---|---|---|---|
| D. 261,142 | 10/1981 | Erickson et al. | D15/110 |
| 318,543 | 5/1885 | Collins | 34/192 |
| 1,301,286 | 4/1919 | Little et al. | 34/195 |
| 1,478,879 | 12/1923 | Nichols | 34/195 |
| 2,456,481 | 12/1948 | Ballantyne et al. | 34/238 |
| 3,367,043 | 2/1968 | Torigian | 34/238 |
| 3,610,884 | 10/1971 | Evans et al. | 219/439 |
| 4,190,965 | 3/1980 | Erickson | 34/197 |
| 4,192,081 | 3/1980 | Erickson et al. | 34/225 |
| 4,224,743 | 9/1980 | Erickson et al. | 34/219 |
| 4,236,063 | 11/1980 | Glucksman | 34/238 |
| 4,380,127 | 4/1983 | Roberts | 34/197 |
| 4,531,306 | 7/1985 | Erickson | 34/44 |
| 4,536,643 | 8/1985 | Erickson | 219/400 |
| 5,215,004 | 6/1993 | Su | 34/197 |
| 5,235,906 | 8/1993 | Hsu | 34/196 |

FOREIGN PATENT DOCUMENTS

| | | |
|---|---|---|
| 880989 | 4/1943 | France . |
| 1042278 | 10/1953 | France . |
| 2610906 | 8/1988 | France . |
| 833925 | 3/1952 | Germany . |

*Primary Examiner*—Denise Gromada
*Attorney, Agent, or Firm*—Merchant, Gould, Smith, Edell, Welter & Schmidt

[57] ABSTRACT

The present food dehydrator may be substantially cylindrical in shape including a base member, an air heating and circulation means, a plurality of stackable trays, and a top. Each tray includes an outer wall structure and a platform section which may be separated from each other. Removal of a platform section when the trays are stacked allows for dehydration of larger items, and otherwise allows for easier cleaning of the tray and for replacement of the platform section. Attachment and detachment is performed by rotation of the platform section with respect to the outer wall structure. A method of forming the two-piece tray for the dehydrator is also disclosed.

20 Claims, 6 Drawing Sheets

FOOD DEHYDRATOR AND TRAY FOR A DEHYDRATOR

BACKGROUND OF THE INVENTION

The present invention relates to the dehydration of food and other material and more particularly to a tray structure used in a dehydration apparatus. Each tray has a platform which is easily removable from the outer wall structure of the tray. The invention also relates to a method of manufacturing the two-piece tray structure.

The dehydration of products such as food is a very old art. Early dehydration was performed through exposure to sunlight and wind. Dehydration has since been conducted using dehydration equipment intended to enhance the process of dehydration. Some dehydration equipment has used natural convection, and other equipment has used forced air. Dehydrators were initially designed with a structure resembling a rectangular counter-top oven. The food support platforms were flat rectangular racks which horizontally slid into the dehydrator enclosure. Several racks were supported inside the dehydrator enclosure upon protrusions extending from the vertical, planar walls of the enclosure. If the food item was too large to fit between dehydrator racks, a user could simply remove one of the upper racks to enlarge the space above a lower rack.

These rectangular dehydrators were found to be quite bulky, and later dehydrators were developed wherein the structure of the rectangular dehydrator enclosure and the structure of the racks were combined in the form of stackable dehydrator trays. The stackable dehydrator trays had an outer wall structure with an air circulation passage to replace the enclosure walls of the rectangular dehydrator. The rectangular dehydrator racks were replaced by food support platforms which were integral with the outer wall structure. Rather than horizontally slide a rectangular rack into the dehydrator enclosure, stackable dehydrator trays actually were the dehydrator enclosure. Because the food support platforms were no longer supported on protrusions extending from the dehydrator enclosure, the trays no longer had to be rectangular. Some stackable dehydrator trays were made having a circular shape. Such later dehydrators include those illustrated in U.S. Pat. Nos. 4,190,965 and 4,536,643, assigned to Alternative Pioneering Systems, Inc.

The previous stackable trays each consist of a single piece of molded plastic, which caused several problems. One problem was that the vertical size of the food to be dehydrated was limited to the vertical distance between tray platforms. This vertical distance in the previous one-piece trays was permanently fixed and was slightly less than the height of the tray. Another problem was that the previous one-piece trays were fairly large and difficult to clean. The one-piece tray design did not allow for separate cleaning of the platform and the wall structure. A third problem was that the previous one-piece trays had to be entirely replaced to change the grate or food platform surface. These problems could not be solved by using sliding trays, because the outer wall structure does not allow horizontal sliding.

SUMMARY OF THE INVENTION

The present invention provides a food hydrator having a base member including a heater coil and a fan, a stack of two-piece stackable trays, and a top. The base member contains the heater coil and the fan which heat and circulate the air throughout the dehydrator.

The base member also supports the stack of trays. Each tray has an outer wall structure and a removable central platform section. Each outer wall structure is shaped so as to securely stack upon the base member or upon another wall structure. Dehydration spaces are defined as the volumes between platform sections on which the items being dehydrated are placed for drying. The top securely covers the uppermost tray in the stack.

The two-piece tray design of the present invention overcomes the problems of the previous trays. Removal of one or more of the upper platforms provides a larger vertical dimension to the dehydration space above a lower tray. The increased vertical size of the dehydration space allows for dehydration of items which would be too tall to fit between fixed tray platforms. The platform section is smaller than the entire tray, and cleaning the trays of the present invention is easier. The platform section of the present invention is easier to fit in a dishwasher or kitchen sink than the previous one-piece trays. The platform section can be cleaned while separated from the wall structure. The present invention allows replacement of the platform with an accessory platform without requiring replacement of the entire tray. This allows both less costly replacement of damaged platform sections and low cost changing of the grate design of the platform sections.

The invention also comprises a method of making the two piece tray. According to the method, the two tray parts, the platform and the wall structure, are formed together in a single injection mold. The platform and wall structure are preferably connected by thin tabs. In order to remove the tray from the mold, one of the mold halves is removed, and pressure is applied to either the platform or the wall structure. Such pressure causes the one part to separate and be removed from the mold, while the other part remains in the mold. The other part is then removed.

This method is preferably performed by using longer ejector pins on the one part than on the other. By this arrangement, when the ejector plate acts on the ejector pins, it first applies pressure only to the longer pins, thus causing the one part to be ejected first. Upon further movement of the ejector plate, the plate contacts the shorter pins, causing the other part to be ejected.

This method has the advantage of allowing both tray parts to be molding in a single mold, but automatically separated upon removal from the mold. Thus, the method reduces tooling and labor costs, as well as molding time.

DETAILED DESCRIPTION OF A PREFERRED EMBODIMENT

Figure 1:
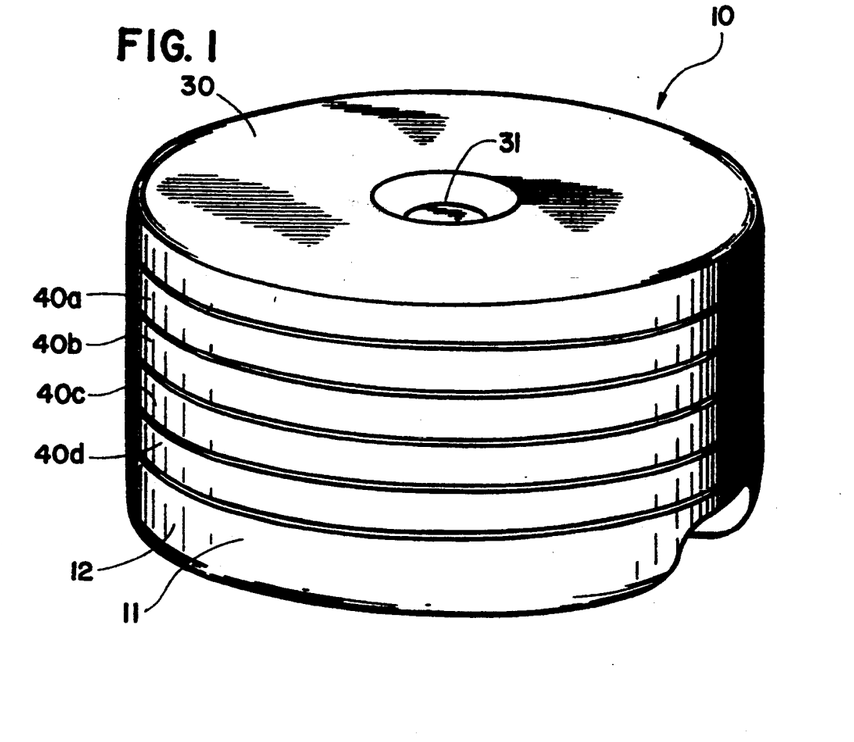
FIG. 1 shows a perspective view of the food dehydrator of the preferred embodiment including three stacked trays.

The food dehydrator 10 as shown in FIG. 1 includes a base member 11, a plurality of dehydrator trays 40a, 40b, 40c, 40d, and a top member 30. The top member 30 is circular and large enough to cover a dehydrator tray 40. The top member 30 has a central opening 31 allowing communication between outside air and the inside of trays 40. The base member 11, trays 40 and top member 30 are preferably formed by injection molding of a thermal plastic material.

Figure 2:
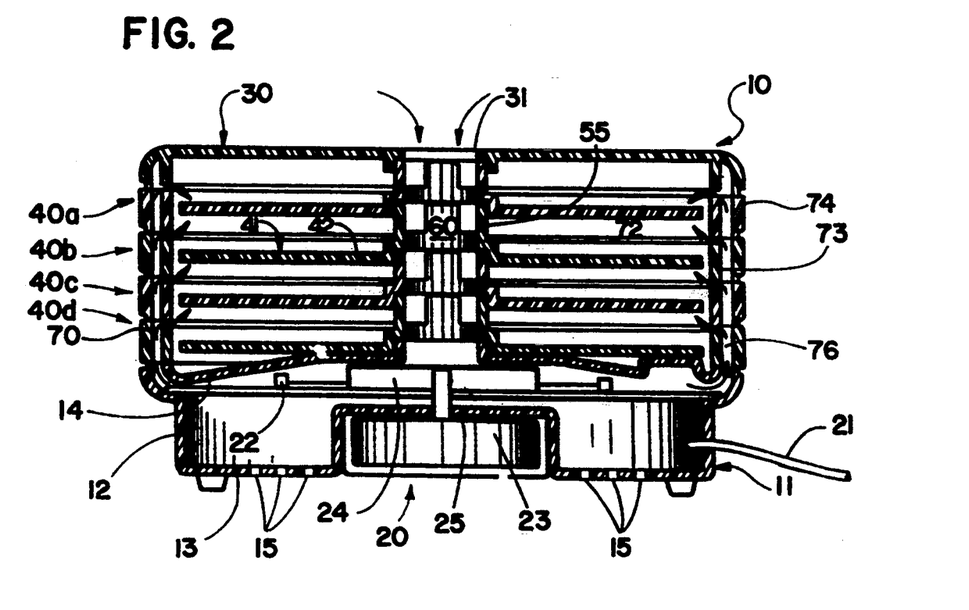
FIG. 2 is a cross-sectional side view of the dehydrator of FIG. 1.

The base member 11, as shown in FIG. 2, contains an air heating and circulation mechanism 20. The air heating and circulation mechanism 20 includes an electrical cord 21 which supplies power to a heating element 22 and a fan motor 23. A fan shaft 25 connects a fan blade 24 to the fan motor 23. Base member 11 has a base circumferential wall 12 and a base bottom wall 13. The base bottom wall 13 has air openings 15, allowing ambient air to enter the base member 11. A base cover 14 encloses the fan blade 24 and heating element 22. The base cover 14 is preferably disk shaped to allow air flow both through the center and around the circumference of the base cover 14, allowing communication between the air in the trays 40 and the air heating and circulation mechanism 20.

The base member 11, air heating and circulation mechanism 20, and top member 30 are substantially similar to those taught in U.S. Pat. No. 4,536,643, which is incorporated herein by reference.

Each two-piece dehydrator tray 40 of the present invention includes a platform 41 and a circular vertical wall 70. The circular vertical wall 70 has an inner circumferential wall 73 and an outer circumferential wall 74, defining an outer airway 76. Platform 41 includes a grate section 42 and a hollow hub section 55 which may be rigidly connected together. Dehydration spaces 72 are defined between the platforms 41 of adjacent trays 40a, 40b, and 40c, and between the inner circumferential wall 74 and the hollow hub section 55. Dehydration spaces 72 are thus the volumes where food may be placed for dehydration. The hollow hub section 55 defines a central airway 60, which allows air communication between outside ambient air, the dehydration spaces 72, and the air heating and circulation mechanism 20.

Figure 3:
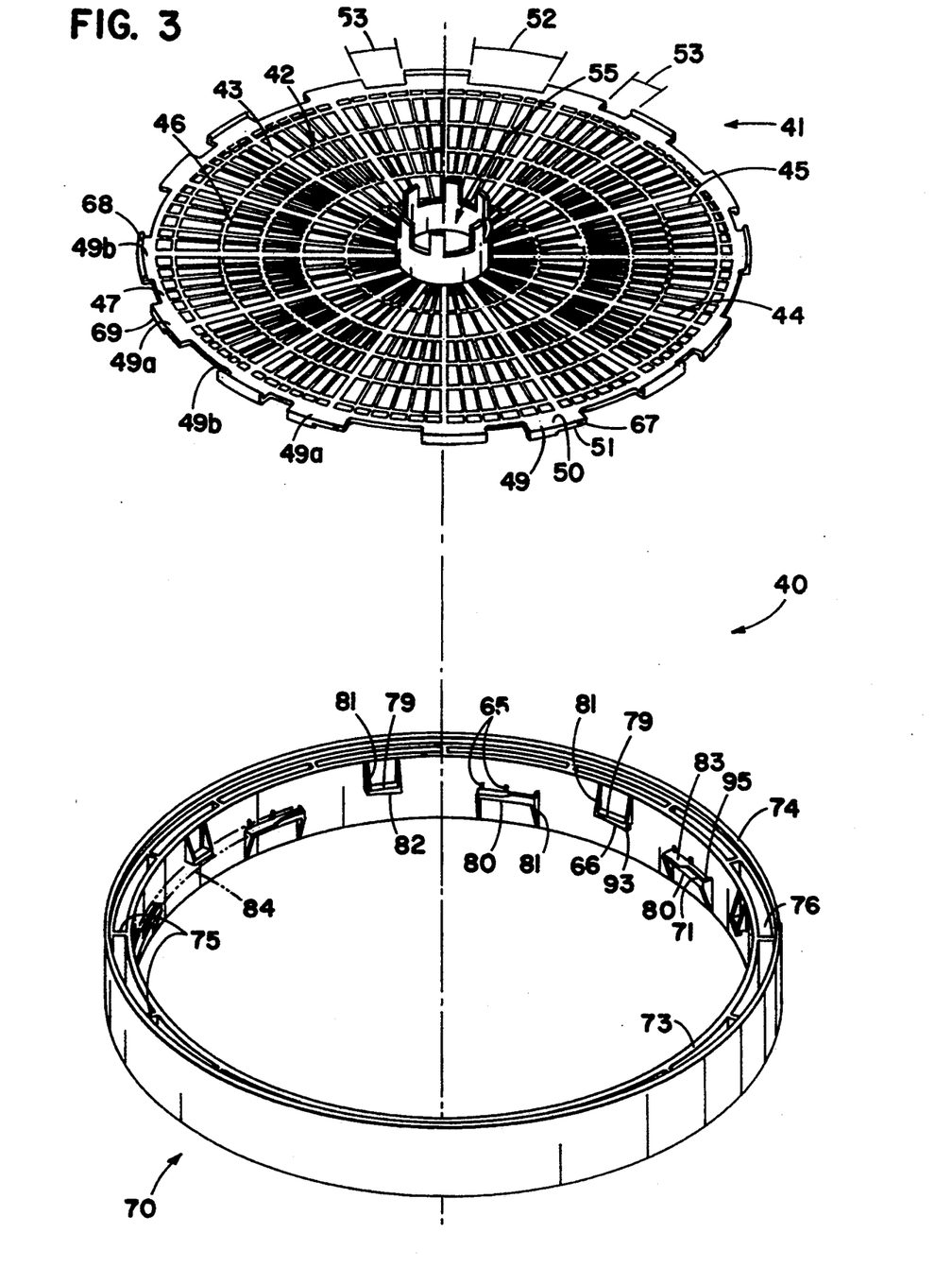
FIG. 3 is an exploded perspective schematic view of the dehydrator tray of the preferred embodiment.

As shown in FIG. 3, the platform 41 and the circular vertical wall 70 are separate. The grate section 42 has spokes 43 which connect with rings 46 to provide a dehydration surface. The spokes 43 preferably include both primary spokes 44 and secondary spokes 45. The primary spokes extend all the way from the hollow hub section and the outside ring 47. The secondary spokes 45 extend from the outside ring to a ring located about two-thirds of the way to the hub. The spokes 43 and rings 46 may be of different thicknesses to provide the desired amount of rigidity and air circulation for the particular design of the grate section 42.

The outside ring 47 of the platform has a plurality of outwardly extending projections 49. Each projection defines an upper surface 50 and a lower surface 51.

While the projections 49 are preferably all of substantially the same width, they are not evenly spaced around outside ring 47. Instead, they are grouped into pairs made up of first projections 49a and second projections 49b so as to form alternating large recesses 52 and small recesses 53.

Figure 5:
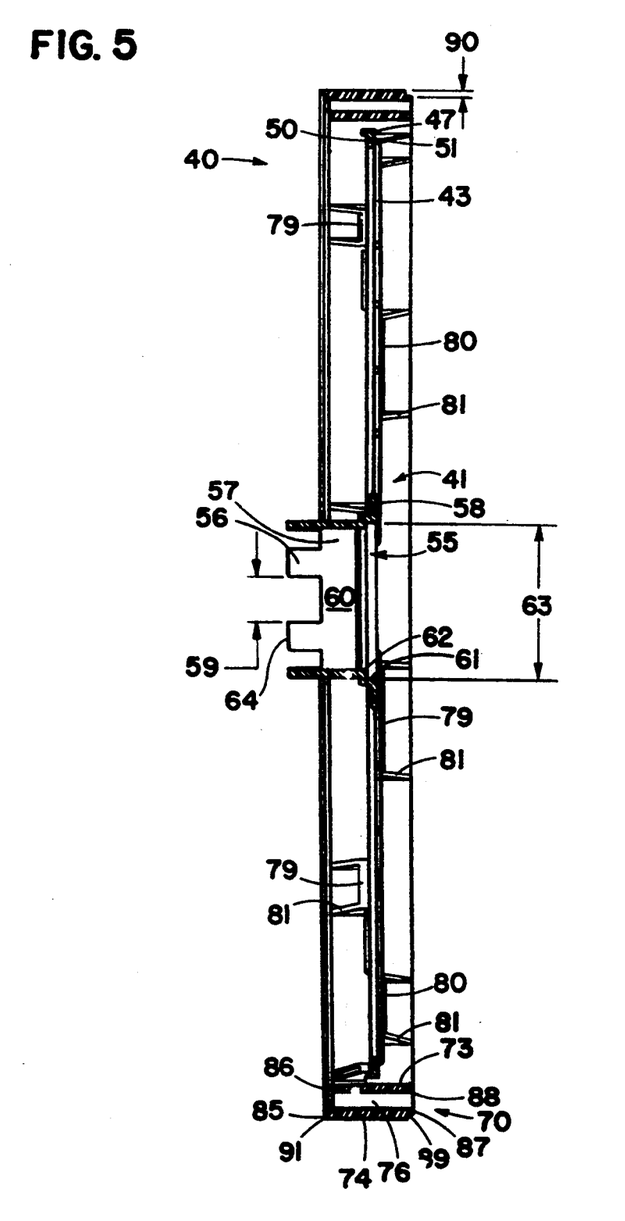
FIG. 5 is a cross-sectional view taken along the line 5—5 in FIG. 4.

The hollow hub section 55 of the platform 41 includes numerous hub projections 56, a hub cylinder 57, and a hub flange 58 (FIG. 5). The hub projections 56 define hub openings 59 which allow air communication between the dehydration spaces 72 and the central airway 60. The hub cylinder 57 and hub projections 56 thus define the central airway 60 through the platform 41.

Hub flange 58 has an inside shoulder 61 and a lower surface 62 which define a hub annulus 63. The hub projections 56 have upper surfaces 64 which may fit securely within the hub annulus 63 to allow secure stacking of the hollow hub sections 55 when the trays 40 are stacked. Alternatively, the hub projections 56 may be slightly shorter, so that the lower surface 62 of an upper tray 40a does not normally contact the upper surface 64 of the hub projections 56 on a lower tray 40b. In this case, the weight of food placed on the upper tray 40a will cause downward deflection of the platform 41, so that the hub projections 56 of the lower tray 40b then support the weighed down upper tray 40a.

The second piece of the two-piece tray 40 is the circular vertical wall 70. As shown in FIG. 2, the platform 41 is disposed within the circular vertical wall 70 so as to define a dehydration space 72. The dehydration space 72 is bordered by the hollow hub 55 on the inside, by the circular vertical wall 70 on the outside, and above and below by the grate sections 42 of the respective dehydrator trays 40a, 40b. A dehydration space 72 thus is present above every platform 41 in the configuration of the dehydrator 10.

As shown in FIG. 3, the circular vertical wall 70 includes inner circumferential wall 73 and outer circumferential wall 74 which is separated by struts 75. The inner circumferential wall 73 and outer circumferential wall 74 thus define outer airway 76.

Referring again to FIG. 5, the outer circumferential wall 74 has a top surface 85 and a bottom surface 87. The inner circumferential wall 73 has a top surface 86 and a bottom surface 88. The bottom surface 87 of the outer circumferential wall 74 includes an outside shoulder 89 which defines an outer circumferential annulus 90. The top surface 85 of the outer circumferential wall 74 includes a rim 91. The rim 91 of a lower tray 40b may fit securely within the outer circumferential annulus 90 of an upper tray 40a to allow for secure stacking of the trays 40.

Optionally, additional openings (not shown) may be defined in inner circumferential wall 73. These openings allow further air communication between the outer airway 76 and the dehydration spaces 72.

Attached to the inner circumferential wall 73 are numerous upper flanges 79 and lower flanges 80. Upper flanges 79 have a flat lower surface 82, while lower flanges 80 have a flat upper surface 83. Flanges 79 and 80 are secured to the inner circumferential wall by braces 81. A vertical space 84 formed between the upper and lower surfaces of the flanges is slightly greater than the width of the outer ring 47 of platform 41.

Figure 4:
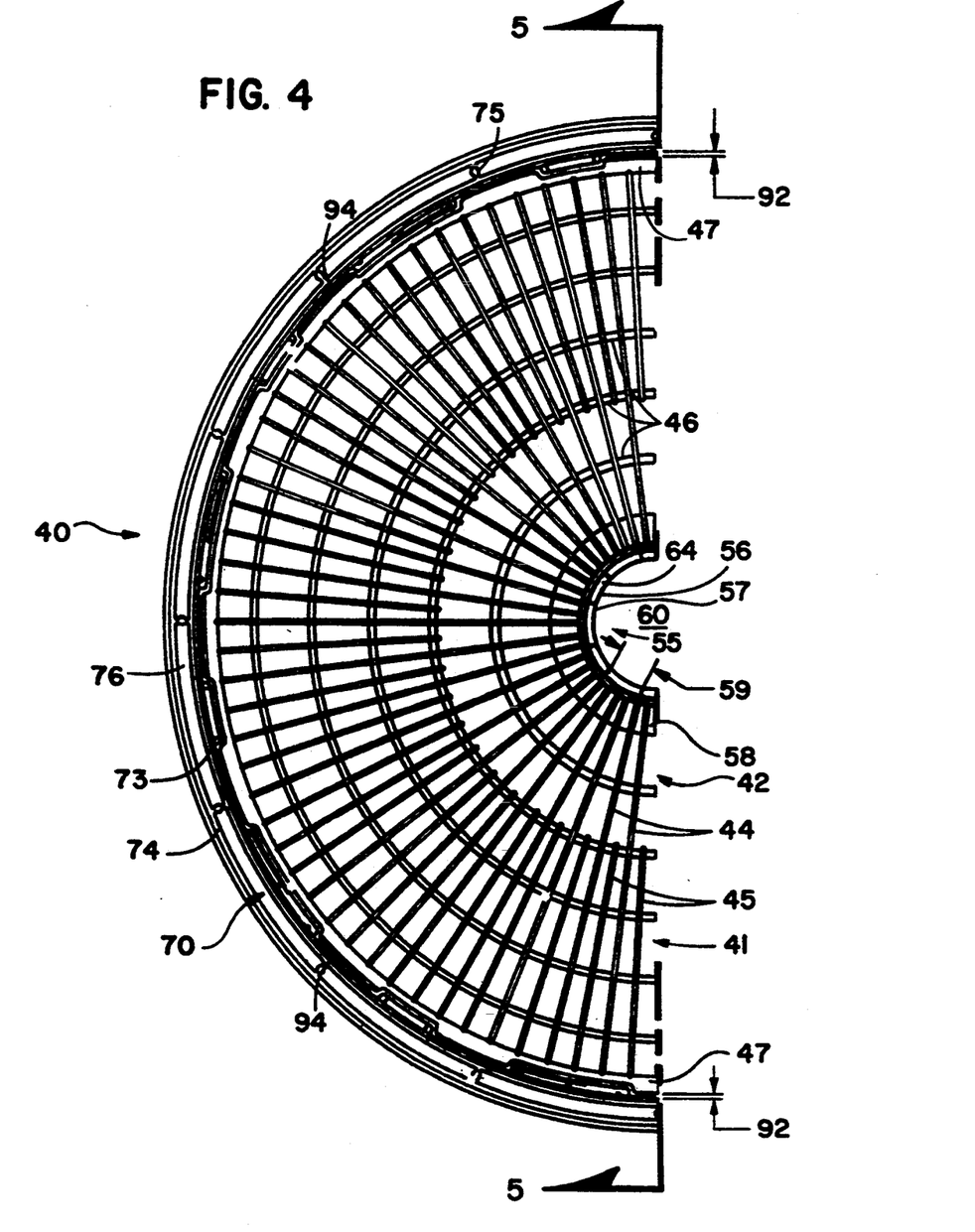
FIG. 4 is half of a top view of the dehydrator tray of the preferred embodiment during molding.

The upper and lower flanges are preferably spaced equidistantly in an alternating manner. The lower flanges 80 have approximately the same width as the large recesses 52 formed on the outer ring of platform 41. Likewise, the upper flanges 79 have substantially the same width as the small recesses 53 formed in the outer ring of platform 41. According to this arrangement, the circular vertical wall 70 and platform 41 can be positioned as shown in FIG. 4 so that upper and lower flanges 79 and 80 intermesh with projections 49 so as to form a small clearance space 92.

Figures 6, 7:
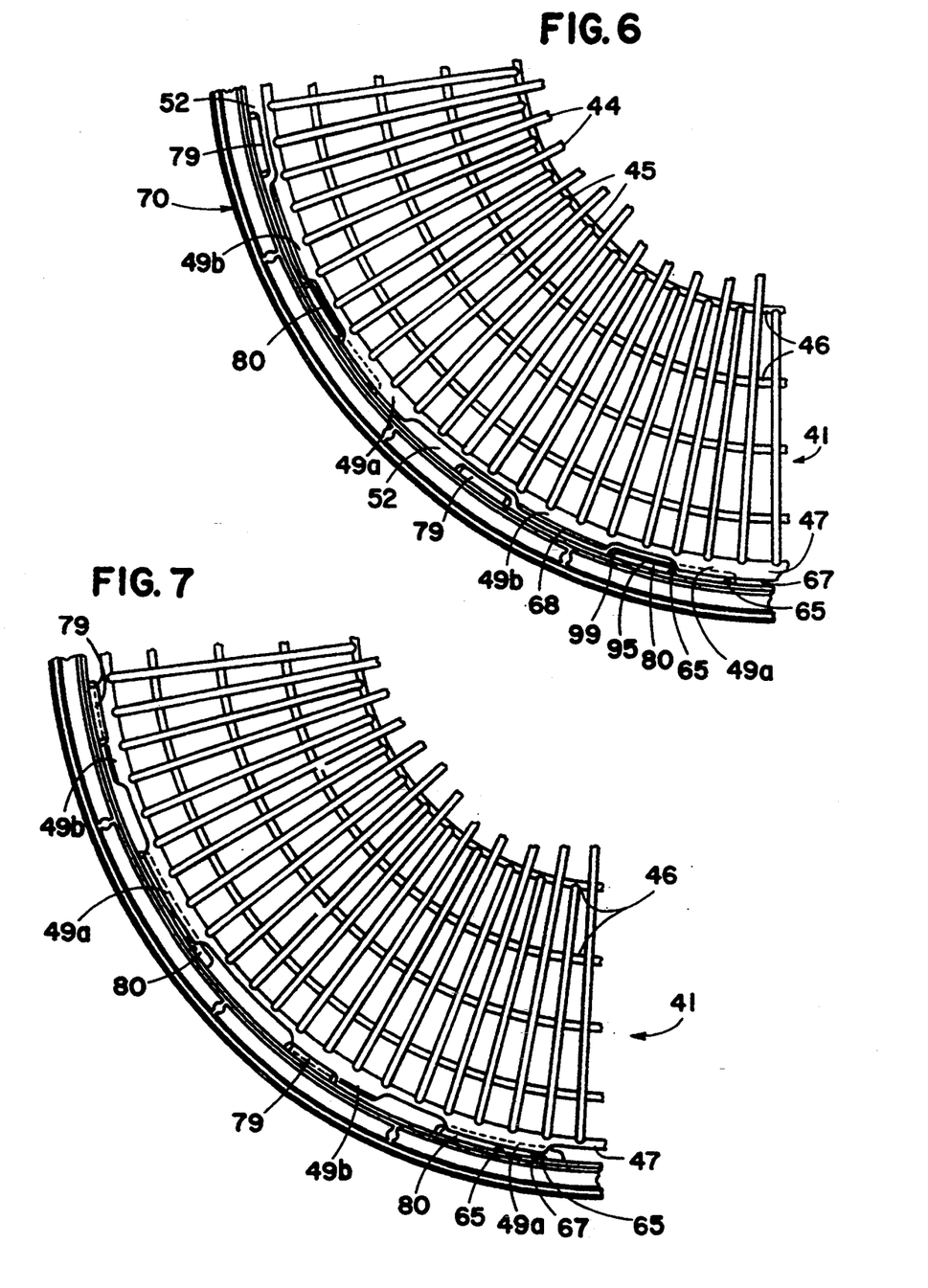
FIG. 6 is an enlarged fragmentary top view of a portion of the dehydrator tray of FIG. 3 in the release position.
FIG. 7 is an enlarged fragmentary top view of a portion of the dehydrator tray of FIG. 3 in the locked position.

Platform 41 is rotatable between a release position, shown in FIG. 6, and a locked position, shown in FIG. 7. In the release position, projections 49a of the platform rest on lower flanges 80, while large recesses 52 of the platform are aligned with upper flanges 79. In this position, the lower flanges prevent the platform from being pushed downward out of connection with circular vertical wall. However, the platform is free to be lifted upwardly, because of the alignment between large recesses 52 and upper flanges 79.

In order to lock platform 41 in place, it is rotated clockwise to the position shown in FIG. 7. In this position, the projections 49a remain resting on lower flanges 80, while the other projections 49b align with upper flanges 79. Thus, the flanges lock the platform in place.

The trays are preferably provided with a means for holding the platform in the locked position. The means will be described with reference to FIGS. 3, 6 and 7.

At least one, and preferably two, bumps 65 are formed on the upper surface of each lower flange 80. Likewise, a small bump 67 is located on the outer edge of each of projections 49a. The bumps 65 and 67 engage each other during rotation of the platform 41 to either the locked or the unlocked position. The bumps are dimesioned so that they provide sufficient resistance to rotation of the platform that the platform will not accidentally move between the locked and unlocked position. However, the resistance provided by the bumps can be overcome by firmly rotating the platform relative to the vertical wall 70.

Each of the projections 49b preferably has an upwardly-extending rail 68 extending along the outer edge thereof. Likewise, each of the projections 49a preferably has a downwardly extending rail 69. The rails 69 only extend along about half of the outer edge of projections 49a. The upper flanges 79 and lower flanges 80 have guides 66 and 71, respectively, which are intended to engage the rails to help guide the rotational movement of the platform 41. The guides 66 are preferably formed of wall portions 93 which extend downwardly from the outer edge of lower flanges 79. The guides 71 are formed of wall portions 95 which extend upwardly from the outer edge of upper flanges 80. Each guide 71 is preferably L-shaped so as to form a stop which engages a rail 69 so as to prevent rotation of the platform past the locked position.

Indicia (not shown) are preferably provided on the outside ring 47 of platform 41 and on the upper flanges 79 of the circular vertical wall. These indicia, which are preferably arrow shapes molded into the structures, indicate to the user the proper alignment of the platform and the circular vertical wall when connecting the platform and vertical wall together. The indicia arrows are positioned so as to be aligned when the tray is in the release position shown in FIG. 6. Further indicia (not shown) are also preferably provided on projections 49a and 49b to indicate to the user the proper direction to rotate the platform in order to lock or release it.

OPERATION OF THE INVENTION

Although operation of the present invention is apparent from the preceding description, it will be detailed hereinafter to provide a more complete understanding of the present invention. A user may unstack the trays 40 to place the items to be dehydrated upon the platforms 41. If the item to be dehydrated is too tall to fit within the dehydration space 72, a user simply detaches the platform 41 of an upper tray 40a and enlarges the dehydration space 72. The platform 41 is rotated with respect to its wall structure into the release position. In this position, upper flanges 80 no longer restrict vertical movement of the projections 49b, and the platform 41 can be freely removed from the circular vertical wall 70. The user then restacks the trays 40 including the wall structure of the upper tray 40a without its platform 41. The wall structure without its platform 41 expands the vertical size of the dehydration space 72 of the lower tray 40b. The user may detach the platforms 41 of a plurality of upper trays 40a, 40b to provide an even taller dehydration space 72 above lower tray 40c. The user may thus selectively choose the levels of circular vertical wall 70 which support platforms 41 and configure the dehydration space 72 for a particular application. The stack of trays containing the items to be dehydrated is placed upon the base member 11, and the top member 30 is placed over the upper tray 40a as shown in FIG. 2.

When the unit is in operation, the fan blade 24 propels air across the heating element 22 and up the outer airway 76. The heated air then flows through the various openings 77 in the inner circumferential wall 73 and across the food items in the dehydration spaces 72. The air exits the dehydration spaces 72 through the openings 59 in the hollow hub section 55 into the central airway 60. The top central opening 31 may cooperate with the central airway 60 to provide communication of the air inside the dehydrator with ambient air. The central airway 60 allows some of the air to escape through the top central opening 31 and also provides a flow of air to the fan blade 24. The path of this air flow is shown by arrows in FIG. 2.

When the trays 40 require cleaning, they are removed from the base member 11 and the top member 30. Each platform 41 may be detached from the circular vertical wall 70. The platform 41 may then be cleaned separately of the circular vertical wall 70. This allows cleaning of the platform 41 in a sink or dishwasher which is too small for the circular vertical wall 70. Separation also allows cleaning of the platform 41 without obstruction from the circular vertical wall 70, and cleaning of the circular vertical wall 70 without obstruction from the platform 41.

If the user wishes to use a tray 40 with a differently designed grate section 42, the user may substitute platforms 41. The platform 41 with the unwanted grate design may be detached from the circular vertical wall 70, and a new platform 41 with the desired grate design may be inserted in its place. The circular vertical wall 70 need not be changed. The user can replace a damaged platform in the same way. Because platforms 41 can be changed without changing the circular vertical wall 70, the cost of changing platforms is significantly lowered.

METHOD OF FORMING THE TWO-PIECE TRAY

According to the preferred embodiment, the two-piece tray just described is formed by injection molding in a single mold, and then separated during removal from the mold.

The tray as it is formed during molding is shown in FIG. 4. As seen therein, platform 41 is oriented so that flanges 79 and 80 intermesh with projections 49, leaving only a small clearance space 92. Thin tabs 94 are formed between the platform and the circular vertical wall 70 which hold the wall and platform together during molding.

Figure 8:
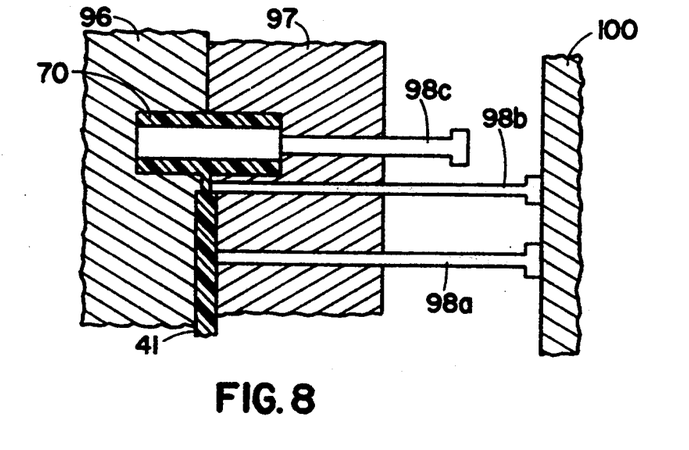
FIGS. 8-10 are fragmentary side views of an injection mold, illustrating the preferred method of forming the dehydrator tray of the present invention.
Figure 9:
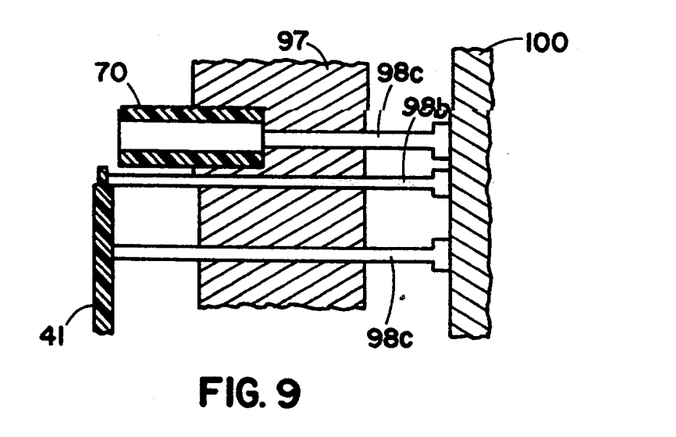
Figure 10:
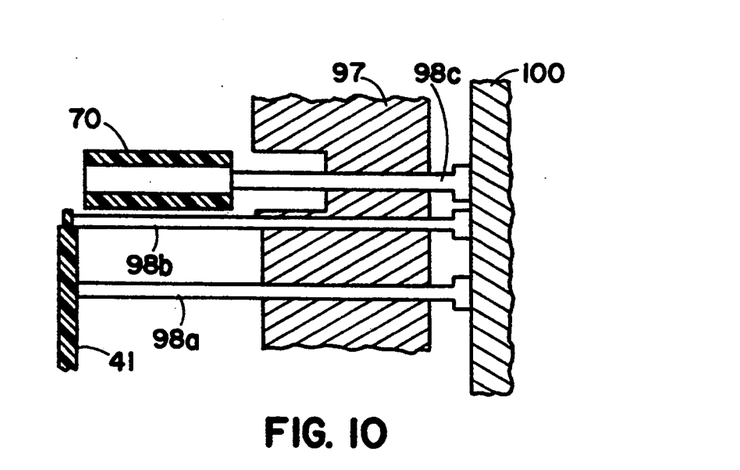

The molding process is illustrated in FIGS. 8–10. In FIG. 8, liquid plastic has been injected between mold halves 96 and 97 to form platform 41 and circular vertical wall 70. In order to remove the tray from the mold, a plurality of ejector pins 98a, 98b, 98c are provided which are actuated by an ejector plate 100. As can be seen, the ejector pins 98a, 98b which contact the platform are longer than the ejector pins 98c contacting the circular vertical wall.

After injecting the plastic material, but before the plastic has completely cooled and hardened, mold half 96 is removed, exposing the tray. Then the ejector plate is moved toward the mold. Because the ejector pins 98a, 98b are longer than ejector pins 98c, the platform 41 will be forced out of the mold while the circular vertical wall 70 remains held by friction within mold half 97, as shown in FIG. 9. During this step, the thin tabs 94 break.

As the ejector plate continues to move toward the mold, ejector pins 98c force the circular vertical wall 70 out of mold half 97, as shown in FIG. 10. The platform and circular vertical wall can then be removed from the open mold either by hand or by mechanical means.

By molding the trays in this manner, the two parts of the tray can be formed in a single mold, thus reducing tooling cost, molding time, and labor cots. And by automatically separating the two pieces from he mold during the removal process, the need for a second operation to separate the two parts is removed.

Although the present invention has been described with reference to a preferred embodiment, workers skilled in the art will recognize that changes may be made in form and detail without departing from the spirit and scope of the invention. Thus, the scope of the invention should be determined with reference not to be preferred embodiment, but to the accompanying claims.

What is claimed is:

1. A food dehydrator for dehydrating items of various sizes, comprising a base member, a top, means for heating and circulating air, and a plurality of two-piece trays adapted to stack upon other like trays, wherein each of said trays comprises a platform having an outer edge and a wall structure which circumscribes said platform, said wall structure being shaped to securely stack upon the wall structure of a like tray, said platform being removably supported by the wall structure along the outer edge of the platform such that the platform is removable from the wall structure for enlarging the volume available for dehydration above said like tray.

2. The food dehydrator of claim 1, wherein the outer edge of the platform has outwardly extending attachment means for removably attaching the platform to the wall structure.

3. The food dehydrator of claim 1, wherein the wall structure has inwardly extending attachment means for removably attaching the platform to the wall structure.

4. The food dehydrator of claim 3 wherein the platform is rotatable between a locked position where the attachment means engages the platform and a release position where the attachment means does not engage the platform.

5. The food dehydrator of claim 4, wherein said attachment means comprises a plurality of flanges extending inwardly from said wall structure.

6. The food dehydrator of claim 5, wherein the platform comprises a plurality of projections designed to selectively engaged said flanges.

7. The food dehydrator of claim 4, wherein the platform outer edge has outwardly extending attachment means for removably attaching the platform to the wall structure.

8. The food dehydrator of claim 1, wherein said wall structure has an inner wall, and further comprising a plurality of lower flanges formed around said inner wall of said wall structure, each of said lower flanges having an upper surface for supporting said platform.

9. The food dehydrator of claim 8, wherein the platform has a plurality of first projections along its outer edge which rest on said lower flanges.

10. The food dehydrator of claim 9, further comprising a plurality of upper flanges formed on the inner wall of said wall structure, each of said upper flanges having a lower surface, wherein a vertical space is formed between the lower surfaces of the upper flanges and the upper surfaces of the lower flanges.

11. The food dehydrator of claim 10, wherein said platform has a plurality of second projections and is rotatable between a position where said upper flanges engage said second projections so as to prevent separation of said platform and said wall structure and a position wherein said upper flanges do not engage said second projections so that said platform is free to be removed from said wall structure.

12. The food dehydrator of claim 10, wherein said upper flanges are narrower than said lower flanges.

13. The food dehydrator of claim 1, wherein the wall structure comprises an inner circumferential wall, an outer circumferential wall, and struts, wherein the struts separate the inner circumferential wall and the outer circumferential wall to define an outer airway for circulation of air within the food dehydrator.

14. The food dehydrator of claim 1, wherein the platform comprises a grate and a hollow hub, and wherein the hollow hub defines a central airway for air circulation within the dehydrator.

15. The food dehydrator of claim 13, wherein the platform comprises a grate and a hollow hub, wherein the hollow hub defines a central airway for air circulation within the dehydrator, wherein the grate is disposed between the inner circumferential wall and the hollow hub, and wherein the inner circumferential wall and the hollow hub have openings so as to allow circulation of air between the outer airway and the central airway across the grate.

16. The food dehydrator of claim 15 wherein the means for heating and circulating air is capable of creating an airflow, wherein the airflow flows from the means for heating and circulating air, up through the outer airway, through the openings in the inner circumferential walls, across the grate, through the openings in the hollow hub, down through the central airway and back to the means for heating and circulating air.

17. A two-piece stackable tray adapted to stack upon other like trays, comprising a platform having an outer edge and a wall structure which circumscribes said platform, said wall structure being shaped to securely stack upon the wall structure of a like tray, said platform being removably supported by the wall structure along the outer edge of the platform such that the platform is removable without tools from the wall structure for enlarging the vertical size of the space above the like platform, wherein the platform is circular, wherein the wall structure comprises means for supporting the platform, and wherein the platform is removably attached to the supporting means along the outer edge of the platform.

18. The two-piece stackable tray of claim 19, wherein the platform is rotatable between a locked position where the supporting means engages the platform and a release position where the supporting means does not engage the platform.

19. The two-piece stackable tray of claim 18, wherein the platform has a plurality of outwardly extending projections, wherein the supporting means has alternating upper and lower flanges, and wherein the alternating upper and lower flanges and the platform projections can be selectively interweaved so as to removably attach the platform to the wall structure.

20. A food dehydrator for dehydrating items of various sizes, comprising a base member, a top, means for heating and circulating air, and a plurality of two-piece trays adapted to stack upon other like trays, wherein each of said trays comprises a wall structure and a platform having an outer edge, said wall structure being shaped to securely stack upon the wall structure of a like tray, said platform being removably supported by the wall structure along the outer edge of the platform such that the platform is removable from the wall structure for enlarging the volume available for dehydration above said like tray;

wherein said platform is rotatable between a locked position where said wall structure engages said platform and a release position where said wall structure does not engage said platform, further comprising means for holding the platform in the locked position.

* * * * *